US010313557B2

(12) United States Patent
Eguchi

(10) Patent No.: US 10,313,557 B2
(45) Date of Patent: Jun. 4, 2019

(54) IMAGE FORMING APPARATUS AND PROGRAM

(71) Applicant: Konica Minolta, Inc., Chiyoda-ku, Tokyo (JP)

(72) Inventor: Munetoshi Eguchi, Tachikawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/466,444

(22) Filed: Mar. 22, 2017

(65) Prior Publication Data
US 2017/0280006 A1    Sep. 28, 2017

(30) Foreign Application Priority Data
Mar. 24, 2016   (JP) ................. 2016-059749

(51) Int. Cl.
*G06F 15/00* (2006.01)
*H04N 1/32* (2006.01)
(Continued)

(52) U.S. Cl.
CPC ......... *H04N 1/32491* (2013.01); *G06F 3/061* (2013.01); *G06F 3/0638* (2013.01); *G06F 3/0647* (2013.01); *G06F 3/0653* (2013.01); *G06F 3/0683* (2013.01); *G06F 13/28* (2013.01); *H04N 1/00042* (2013.01); *H04N 1/00076* (2013.01); *H04N 1/2108* (2013.01); *H04N 1/64* (2013.01); *H04N 1/648* (2013.01); *H04N 2201/0005* (2013.01); *H04N 2201/0087* (2013.01); *H04N 2201/0094* (2013.01); *H04N 2201/325* (2013.01); *H04N 2201/3287* (2013.01)

(58) Field of Classification Search
CPC ........... H04N 1/32491; H04N 1/00042; H04N 1/00076; H04N 1/2108; H04N 1/648; G06F 3/061; G06F 3/0638; G06F 3/0647; G06F 3/0653; G06F 3/0683; G06F 13/28
USPC ....................................... 358/1.17
See application file for complete search history.

(56) References Cited

U.S. PATENT DOCUMENTS

| 8,867,085 | B2 * | 10/2014 | Konno | G06K 15/1896 358/1.16 |
| 8,995,016 | B2 * | 3/2015 | Nakata | G06K 15/02 347/43 |
| 2010/0060933 | A1 * | 3/2010 | Ogura | H04N 1/0473 358/1.16 |

FOREIGN PATENT DOCUMENTS

JP    2011-073259 A    4/2011

* cited by examiner

*Primary Examiner* — Mark R Milia
(74) *Attorney, Agent, or Firm* — Buchanan Ingersoll & Rooney PC

(57) ABSTRACT

An image forming apparatus includes: a first memory for temporarily storing therein image data output to an image forming unit; a data processing processor for reading the image data; a second memory for temporarily storing therein the image data; and a main processor for causing the data processing processor to sequentially read the image data, wherein the data processing processor includes: data transfer units; a transfer control unit; and a table, the main processor sets a start address and a size and instructs the transfer control unit to activate the data transfer units, the transfer control unit divides a size of image data and sets a start address and a size of divided image data, the data transfer units read corresponding image data and output it to the second memory, and the transfer control unit subsequently controls the data transfer units and notifies the transfer completion to the main processor.

11 Claims, 9 Drawing Sheets

(51) Int. Cl.
*G06F 3/06* (2006.01)
*G06F 13/28* (2006.01)
*H04N 1/00* (2006.01)
*H04N 1/21* (2006.01)
*H04N 1/64* (2006.01)

IMAGE FORMING APPARATUS AND PROGRAM

The entire disclosure of Japanese Patent Application No. 2016-059749 filed on Mar. 24, 2016 including description, claims, drawings, and abstract are incorporated herein by reference in its entirety.

BACKGROUND OF THE INVENTION

Field of the Invention

The present invention relates to an image forming apparatus suitable for transferring image data used for image formation, and a program therefor.

Description of the Related Art

In recent years, an image forming apparatus such as copying apparatus or multi-function apparatus mounts thereon an image processing integrated circuit such as application specific integrated circuit (ASIC), in which image data to be printed, such as image data of reference colors of C (cyan), M (magenta), Y (yellow), and K (black), is temporarily developed in a main memory and then the image data of each print (each color) is read from the main memory by a direct memory access controller (DMAC) in response to an image request from an engine to be DMA-transferred to the engine.

Along with an increase in colors, the amount of image data to be transferred increases according to the number of increased colors. There is disclosed a technique for more rapidly transferring image data of more colors while restricting cost also when the amount of image data to be transferred increases along with an increase in colors (see JP 2011-073259 A, for example).

The copying apparatus described in JP 2011-073259 A reads the image data of the reference colors CMYK from the main memory by the DMA controllers (13C to 13K) and outputs it to the engines (8C to 8K) via the respective line FIFO. The copying apparatus according to JP 2011-073259 A reads the image data of a special color from the main memory by the DMA controllers for CMYK to be written into a page memory by a page memory write control unit before reading the image data of the reference colors CMYK at the first page and at an interval to read the image data of the reference colors CMYK between a previous page and a next page after the second page. The image data written into the page memory is read by a page memory read control unit to be output to an engine for special color (8C1).

With the technique described in JP 2011-073259 A, there are provided four DMA controllers for the colors CMYK in total, and image data of a fifth special color is distributed and transferred by the four DMA controllers thereby to achieve higher speed in data transfer (FIG. 5 in JP 2011-073259 A). However, JP 2011-073259 A does not describe how to control the four DMA controllers, or particularly a control method for distributing one color into the four DMA controllers.

For distribution and control in a typical control method, the CPU activating the DMA controllers needs to previously divide a size of image data on a main memory and to set an address and a size of the divided image data. The CPU needs to process a notification of transfer completion per DMA controller, which increases the CPU processing or the software processing.

SUMMARY OF THE INVENTION

The present invention has been made in consideration of the above situation, and an object thereof is to distribute and transfer one page of image data stored in a main memory in a plurality of DMA controllers without changing software and increasing loads on the CPU.

To achieve the abovementioned object, according to an aspect, an image forming apparatus reflecting one aspect of the present invention comprises: a first memory for temporarily storing therein image data of a predetermined number of colors output to an image forming unit for forming an image per predetermined color; a data processing processor for reading the image data of each color from the first memory; a second memory for temporarily storing therein the image data of each color read from the first memory; and a main processor for causing the data processing processor to sequentially read the image data of each color from the first memory and output it to the second memory.

The data processing processor comprises: a plurality of data transfer units provided corresponding to each color for reading the image data from the first memory and transferring it to the second memory; a transfer control unit for controlling and monitoring a processing of transferring the image data by the data transfer units; and a table, which is referred to when the data transfer units transfer one page of image data, for setting therein a start address and a size of one page of image data of each color in the first memory.

The main processor sets a start address and a size of one page of the image data of each color in the first memory in the table in the data processing processor, and then instructs the transfer control unit in the data processing processor to activate the data transfer units.

Furthermore, when receiving the instruction to activate the data transfer units from the main processor, the transfer control unit divides a size of one page of image data of one color depending on information on a size of the one page of image data to be transferred and/or the number of data transfer units with reference to the table, and sets a start address and a size of each item of divided image data of the one page of image data of one color in each of the data transfer units.

Furthermore, each of the data transfer units reads corresponding image data from the image data of one color in the first memory and outputs it to the second memory on the basis of the start address and the size of each item of divided image data of the one page of image data of one color.

After the data transfer units finish transferring the one page of image data of one color, the transfer control unit subsequently controls the data transfer units for dividing a start address and a size of one page of image data of a next color and transferring the image data, and when one page of image data of all the colors is completely transferred, notifies the transfer completion of one page of image data of all the colors to the main processor.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
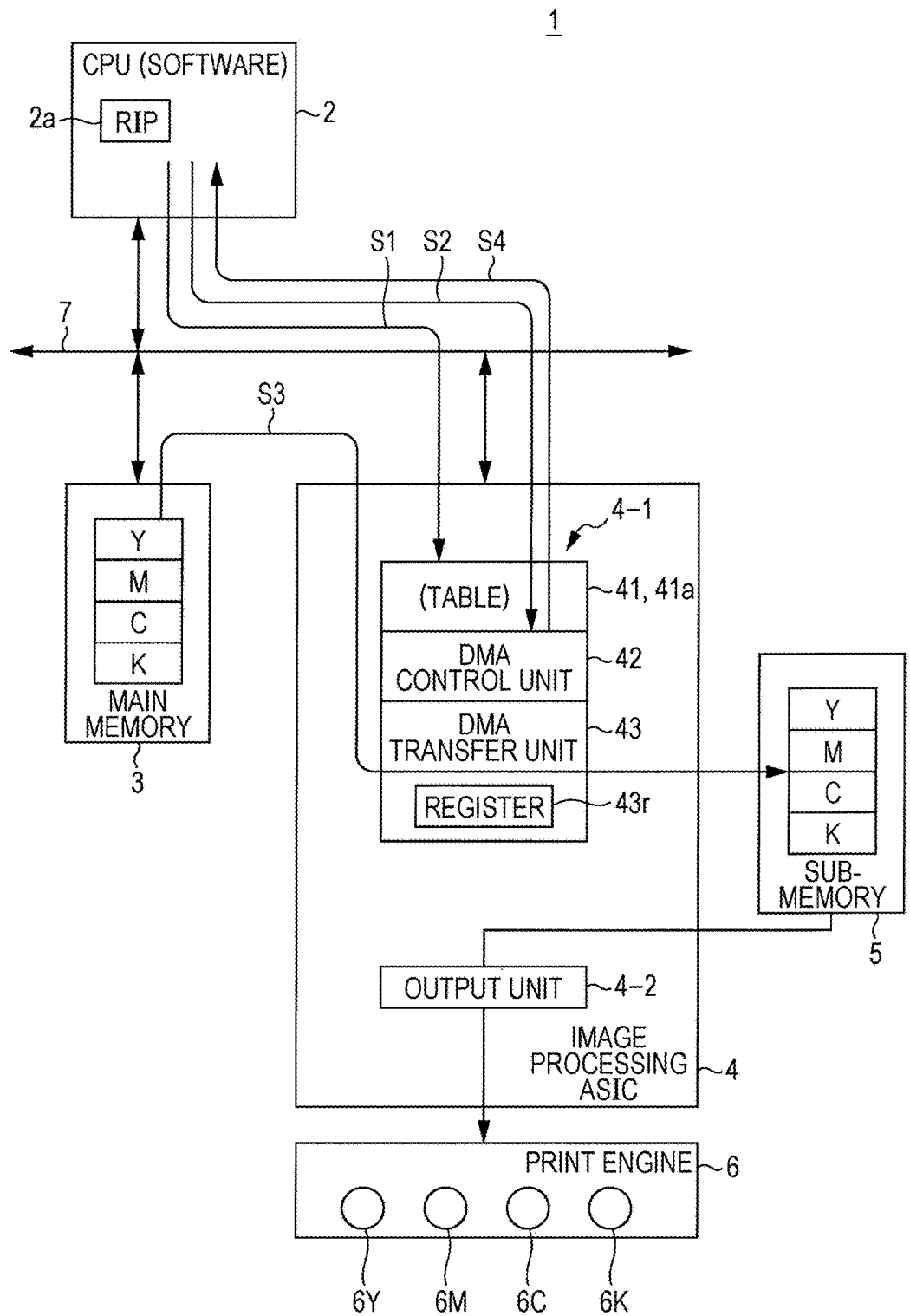
FIG. 1 is a block diagram illustrating an exemplary schematic configuration for performing a data transfer processing in an image forming apparatus according to an embodiment of the present invention.

Hereinafter, an embodiment of the present invention will be described with reference to the drawings. However, the scope of the invention is not limited to the illustrated examples. The components having substantially the same functions or configurations in each Figure are denoted with the same reference numerals, and a repeated description thereof will be omitted.

1. First Embodiment

[Outline of Image Forming Apparatus]

FIG. 1 is a block diagram illustrating an exemplary schematic configuration for performing a data transfer processing in an image forming apparatus according to a first embodiment of the present invention. An image forming apparatus 1 according to the present embodiment employs an electrophotographic system for forming an image by use of static electricity, and can form a color image in which four toner images of Y (yellow), M (magenta), C (cyan), and K (black) are overlapped, for example. The image forming apparatus 1 assumes a multi-function printer (MFP) provided with a copying function, a scanning function, and a printing function. For example, the image forming apparatus 1 forms and outputs an image or document on a designated sheet (recording medium) on the basis of the jobs issued by the copying function and the printing function.

The image forming apparatus 1 includes a CPU 2, a main memory 3, an image processing ASIC 4, a sub-memory 5, and a print engine 6. The CPU 2, the main memory 3, and the image processing ASIC 4 are connected via a bus 7 to mutually exchange data.

The CPU 2 (exemplary main control unit) is a calculation processing device for collectively controlling the operations of the image forming apparatus 1. The CPU 2 reads the programs stored in a nonvolatile storage unit such as ROM (not illustrated), and develops and executes them in the RAM in the main memory 3 so that various functions of the CPU 2 are realized. The CPU 2 causes the image processing ASIC 4 to sequentially read the image data of each color in the main memory 3 and output it to the sub-memory 5.

The CPU 2 includes a RIP processing unit 2a (indicated as "RIP" in FIG. 1). The CPU 2 performs a rasterization processing (called RIP processing) on the input data fetched by the jobs received via a communication unit or the like (not illustrated) by the RIP processing unit 2a thereby to generate and save a tag bit plane, a Y plane, a M plane, a C plane, and a K plane in a hard disc device or the like (nonvolatile storage unit) (not illustrated). The Y plane, the M plane, the C plane, and the K plane are bitmap data of yellow (Y), magenta (M), cyan (C) and black (K), respectively, which are used as YMCK image forming data (document image data). One page of data of the image forming data corresponds to one page of image data to be transferred according to the present embodiment.

The main memory 3 (exemplary first memory) is a volatile storage unit for temporarily storing image data of a predetermined number of colors corresponding to predetermined colors. According to the present embodiment, the image data of four reference colors (Y, M, C, and K) is stored. The CPU 2 performs the RIP processing on the image data designated by a job when performing the job, and temporarily stores it as the YMCK image forming data in the main memory 3. The main memory 3 has a larger capacity than the sub-memory 5 and a buffer memory 44 which are also volatile storage units.

The image processing ASIC (exemplary data processing circuit unit) 4 is an integrated circuit for reading the image data of each color from the main memory 3 and transferring it to the sub-memory 5. When requested to perform a job, the image processing ASIC 4 sequentially reads one page of image data developed in the main memory 3 in units of line per color, and transfers it to the sub-memory 5. The image processing ASIC 4 includes a transfer unit 4-1 and an output unit 4-2.

The transfer unit 4-1 corresponds to a DMA controller, and includes a register 41, a DMA control unit 42, and a DMA transfer unit 43.

Figure 4:
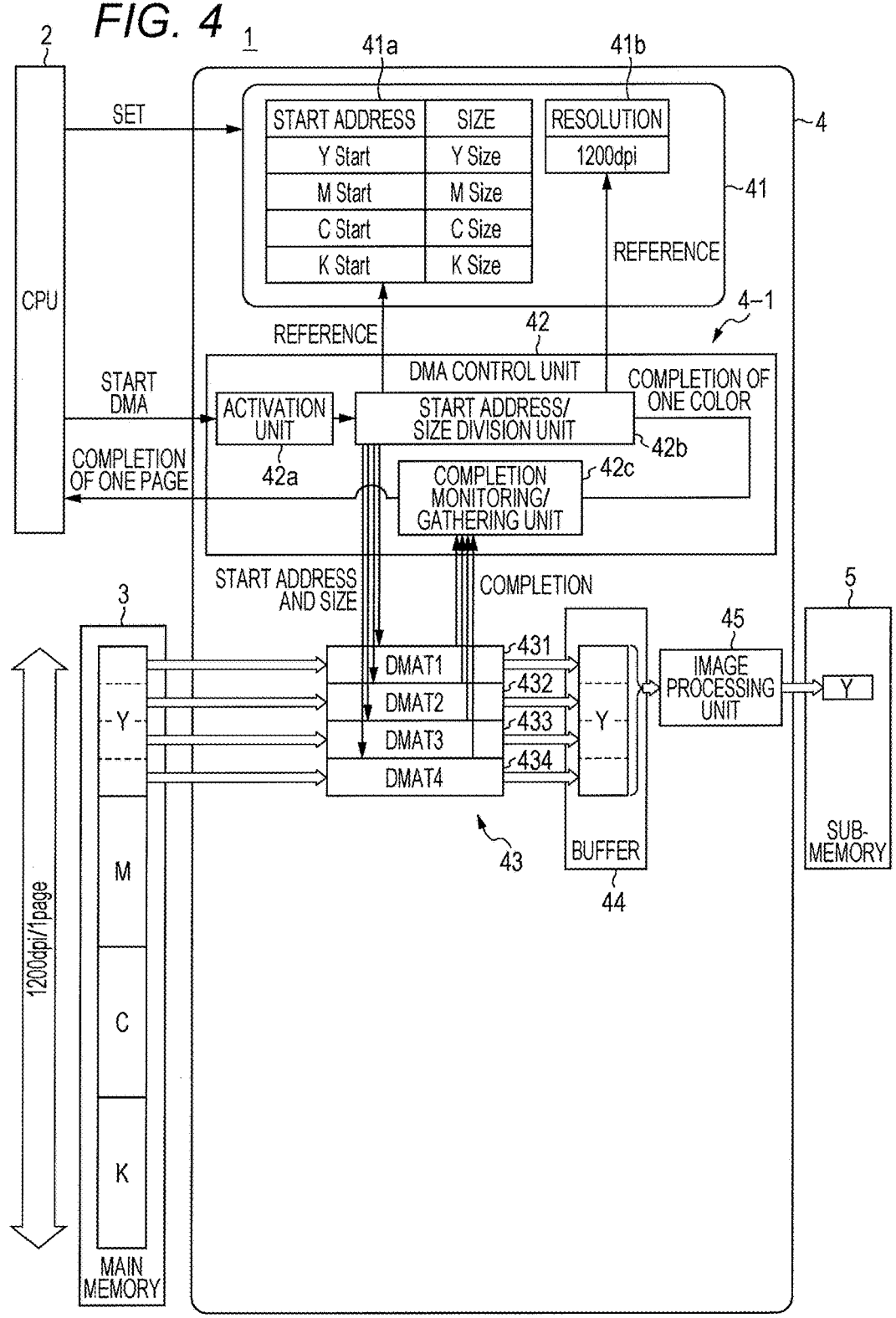
FIG. 4 is a sequence diagram illustrating an exemplary internal configuration of an image processing ASIC in an image forming apparatus according to a first embodiment of the present invention.

The register 41 is set with a start address and a size (refer to a setting table 41a in FIG. 4 described below) for one page of image data of each color in the main memory 3 referred to when the DMA transfer unit 43 transfers one page of image data. The start address is a head address value when reading the image data stored in the main memory 3. When a start address and a size are known, the head address and the end address of image data to be read in the main memory 3 can be determined. As illustrated in FIG. 4 described below, the register 41 may hold resolution information 41b of the image data stored in the main memory 3.

The DMA control unit 42 (exemplary transfer control unit) controls and monitors the image data transfer processing by the DMA transfer unit 43.

The DMA transfer unit 43 (exemplary data transfer unit) reads the designated image data from the main memory 3 and transfers it to the sub-memory 5 under control of the DMA control unit 42. According to the present embodiment, the DMA transfer unit 43 includes four DMA transfer units 431 to 434 corresponding to the colors YMCK, respectively (see FIG. 4). The DMA transfer units 431 to 434 each include a register 43r. The register 43r is set and stored with address information and size information of the image data to be referred to when each of the DMA transfer units 431 to 434 reads the image data from the main memory 3. In the following description, when the DMA transfer units 431 to 434 are not discriminated from each other or the DMA transfer units 431 to 434 are collectively referred to, they may be denoted as "DMA transfer unit 43."

The sub-memory 5 (exemplary second memory) is connected to the image processing ASIC 4, and temporarily stores therein the image data of reach color read from the main memory 3. The output unit 4-2 reads the image data of each color stored in the sub-memory 5 in units of line per color, and transfers it to the print engine 6.

The print engine 6 (image forming unit) records and outputs an image to a sheet (recording medium) in the electrophotographic system on the basis of the image data of each color supplied from the output unit 4-2. The image forming apparatus 1 includes a sheet feeding unit, a fixing unit, a sheet discharging unit, and the like (not illustrated) in addition to the print engine 6, and the print engine 6 includes the engines for four colors YMCK. The sheet feeding unit separates a plurality of sheets housed in a sheet feeding tray and feeds them to the print engine 6 one by one.

The print engine 6 includes photosensitive bodies 6Y, 6M, 6C, and 6K per color. A charging unit, an optical write unit, a development unit, a transfer unit, a neutralization unit, a cleaning unit, and the like (not illustrated) are arranged around each of the photosensitive bodies 6Y, 6M, 6C, and 6K. The print engine 6 operates the optical write unit by the image data of corresponding color (image forming data) to form an electrostatic latent image on the photosensitive body 6Y, 6M, 6C, or 6K, and supplies a toner to the photosensitive body 6Y, 6M, 6C, or 6K by the development unit thereby to develop and form a toner image. The print engine 6 sequentially transfers and overlaps the toner image of each color on the photosensitive body 6Y, 6M, 6C, or 6K onto a sheet fed between the photosensitive body 6Y, 6M, 6C, or 6K and the transfer unit from the sheet feeding unit, thereby forming a color toner image on the sheet. The image forming apparatus 1 feeds the sheet transferred with the color toner image to the fixing unit, and heats and pressurizes it in the fixing unit thereby to fix the color toner image on the sheet.

Though not illustrated in FIG. 1, the transfer unit 4-1 includes the buffer memory 44 and an image processing unit 45 as illustrated in FIG. 4 described below (see FIG. 4).

A flow of basic DMA transfer in the image forming apparatus 1 will be described.
(1) The CPU 2 (software) sets a start address and a size of image data to be transferred in the register 41 in the image processing ASIC 4 via the bus 7 (S1).
(2) The CPU 2 instructs the DMA control unit 42 to activate the DMA transfer unit 43 via the bus 7 (S2). Herein, the right to use the bus 7 is adjusted between the CPU 2 and the DMA control unit 42.
(3) The DMA transfer unit 43 refers to the contents (the setting table 41a) in the register 41 in response to an instruction of the DMA control unit 42, and reads the designated image data from the main memory 3 and transfers it to the sub-memory 5 via the bus 7 (S3).
(4) The DMA control unit 42 notifies completion of the image data transfer by the DMA transfer unit 43 to the CPU 2 via the bus 7 (S4).

[Conventional Technique]

A conventional image data transfer processing will be described in detail with reference to FIG. 2 before describing the image data transfer processing according to the first embodiment in detail. The components having substantially the same functions or configurations as in FIG. 1 are denoted with the same reference numerals in FIG. 2, and a repeated description thereof will be omitted.

Figure 2:
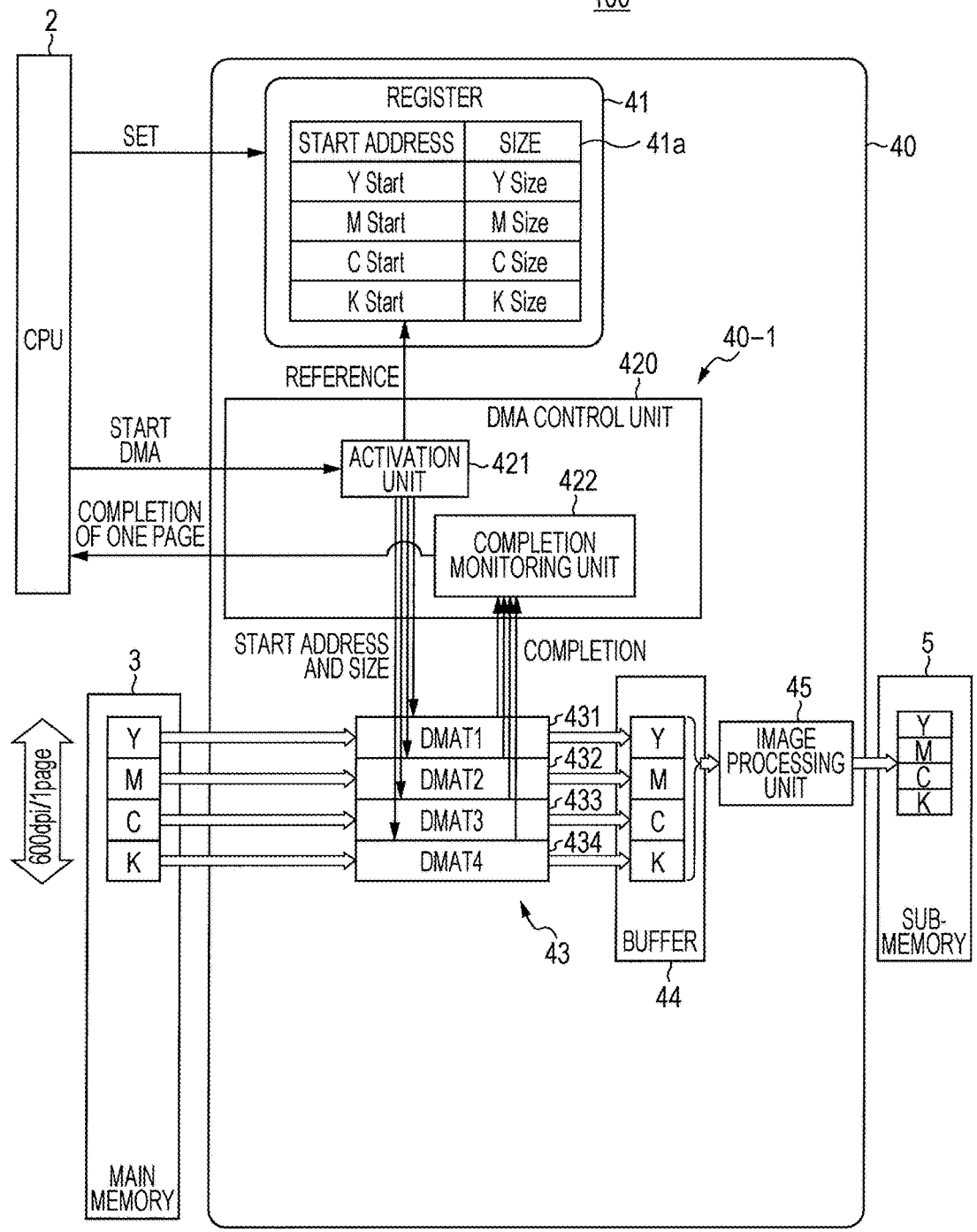
FIG. 2 is a block diagram illustrating an exemplary internal configuration of an image processing ASIC in a conventional image forming apparatus.

FIG. 2 is a block diagram illustrating an exemplary internal configuration of an image processing ASIC in a conventional image forming apparatus. An image forming apparatus 100 illustrated in FIG. 2 includes an image processing ASIC 40 storing a transfer unit 40-1 therein. The image processing ASIC 40 includes the output unit 4-2 of FIG. 1, which is not illustrated.

The transfer unit 40-1 includes the register 41, a DMA control unit 420, the DMA transfer unit 43, the buffer memory 44, and the image processing unit 45. The DMA control unit 420 includes an activation unit 421 and a completion monitoring unit 422. The functions of the activation unit 421 and the completion monitoring unit 422 will be described with reference to FIG. 3.

The DMA transfer unit 43 includes four DMA transfer units 431 to 434 for four colors YMCK. The DMA transfer units 431 to 434 are denoted as DMAT1 to DMAT4 in FIG. 2, respectively. The register 41 in the transfer unit 40-1 is set with a start address and a size of one page of image data of each color in the main memory 3 for each of the DMA transfer units 431 to 434 by the CPU 2. In FIG. 2, the size of the image data stored in the main memory 3 is equivalent to a resolution of 600 dpi by way of example.

The buffer memory 44 is used by the image processing unit 45, and temporarily stores therein the image data read by the DMA transfer unit 43. The capacity of the buffer memory 44 can afford the image data with a resolution of 1000 dpi, for example. The buffer memory 44 has a larger capacity than the size (corresponding to 1000 dpi) of the image data to be transferred in the main memory 3, and thus can store one page of image data therein.

The image processing unit 45 converts the image data stored in the buffer memory 44 into a resolution or gradation requested by the print engine 6 (FIG. 1) to be output to the sub-memory 5. According to the present embodiment, the converted image data has a smaller data size than the non-converted one.

The buffer memory 44 and the image processing unit 45 may be provided outside the image processing ASIC 40. Alternatively, the buffer memory 44 and the image processing unit 45 may not be necessarily provided.

Figure 3:
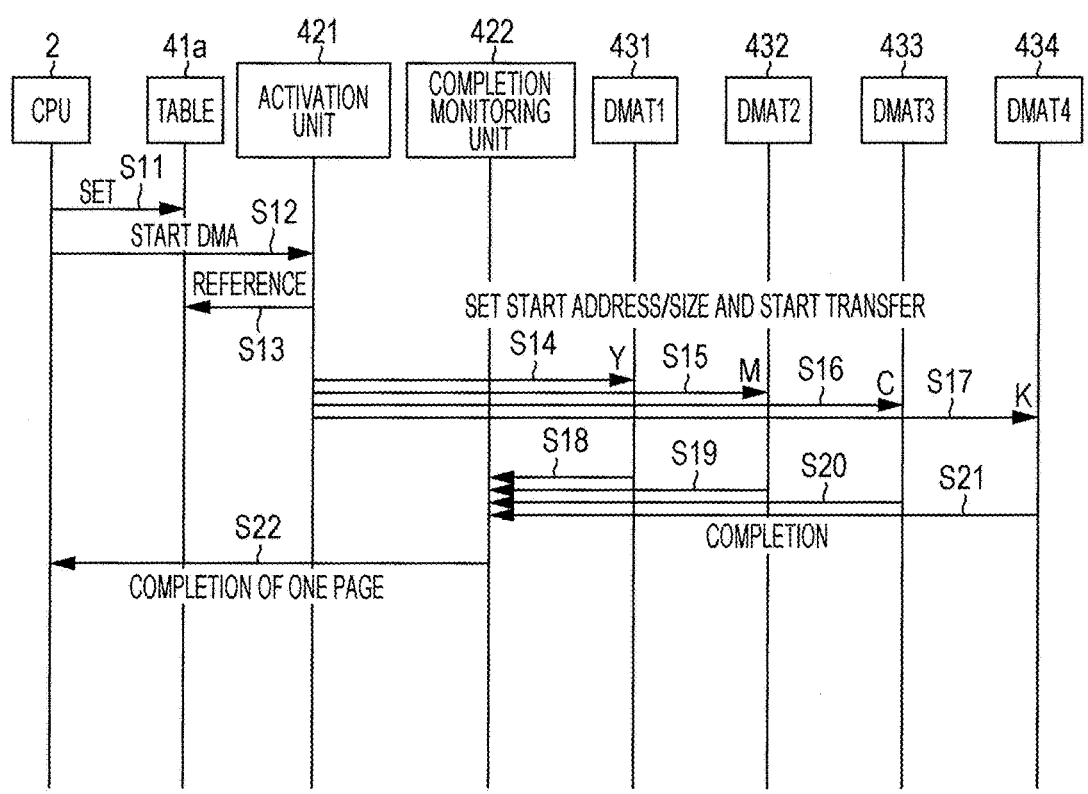
FIG. 3 is a sequence diagram illustrating a DMA transfer processing by the image processing ASIC in the conventional image forming apparatus.

A flow of DMA transfer by the image processing ASIC 40 in the conventional image forming apparatus 100 will be described below. FIG. 3 is a sequence diagram for explaining DMA transfer by the image processing ASIC 40 in the image forming apparatus 100.

In FIG. 3, at first, when the YMCK image data stored in the main memory 3 is DMA-transferred, the CPU 2 sets a start address and a size of one page of image data of each color to be transferred in the setting table 41a in the register 41 in the transfer unit 40-1 (S11). In the example illustrated in FIG. 2, a start address of "Y Start" and a size of "Y Size" are set for one page of image data of color Y. Similarly, "M Start" and "M Size," "C Start" and "C Size," and "K Start" and "K Size" are set for the start addresses and the sizes of one page of image data of the colors MCK, respectively.

The CPU 2 then instructs the activation unit 421 in the DMA control unit 420 to activate the DMA transfer unit 43 or to start DMA transfer (S12).

When instructed to start DMA transfer by the CPU 2, the activation unit 421 then refers to the setting table 41a in the register 41 to acquire the start address and the size of one page of image data of each color of YMCK (S13).

The activation unit 421 then sets (stores) the start address and the size of one page of image data of each color of YMCK in each register 43r in each of the DMA transfer units 431 to 434, and activates each of the DMA transfer units 431 to 434 to start DMA transfer (S14 to S17). Thereby, each of the DMA transfer units 431 to 434 reads one page of image data of each corresponding color from the main memory 3, and outputs (transfers) it to the buffer memory 44. The transfer processing may be sequentially performed in the DMA transfer units 431 to 434, or may be performed in parallel.

Thereafter, when finishing transferring one page of image data of each color, each of the DMA transfer units 431 to 434 notifies transfer completion to the completion monitoring unit 422 in the DMA control unit 420 (S18 to S21).

After receiving the notifications of transfer completion of one page of image data of each color from the DMA transfer units 431 to 434, the completion monitoring unit 422 notifies the transfer completion of one page of image data of all the colors to the CPU 2 (S22).

In recent years, higher resolution has been achieved and the image size has been larger. If the image size is larger, when the buffer size of the buffer memory 44 behind the DMA transfer unit 43 is increased, the software does not need to be changed but the cost therefor increases. The setting table 41*a* and the buffer memory 44 can be used as before by dividing and setting the start addresses and the sizes in the software in the conventional setting table 41*a*, but the software needs to be modified. Further, the numbers of times of the setting of the setting table 41*a* and the completion notification processing increase, and thus the loads on the CPU 2 increase.

To the contrary, the image forming apparatus according to an embodiment of the present invention can realize DMA transfer without changing the software and increasing the loads on the CPU even when the image size is large. A specific configuration of the image forming apparatus according to an embodiment of the present invention will be described below.

Internal Configuration of Image Processing ASIC According to First Embodiment

A first embodiment is an example in which when a resolution of image data is high or a size of image data is large, one page of image data of one color is distributed and transferred in four DMA transfer units.

FIG. 4 is a block diagram illustrating an exemplary internal configuration of the image processing ASIC 4 in the image forming apparatus 1 according to the first embodiment.

The image forming apparatus 1 according to the first embodiment is different from the conventional image forming apparatus 100 in the configuration of the DMA control unit 42 and the DMA transfer operation. In FIG. 4, a size of the image data stored in the main memory 3 corresponds to a resolution of 1200 dpi by way of example. The register 41 stores therein a start address and a size (the setting table 41*a*) of one page of image data per color as conventionally. The register 41 holds a resolution (1200 dpi) of the image data stored in the main memory 3 as resolution information 41*b*. The buffer size of the buffer memory 44 is not changed as before. The output unit 4-2 and the print engine 6 in FIG. 1 are not illustrated in FIG. 4.

The DMA control unit 42 includes an activation unit 42*a*, a start address/size division unit 42*b*, and a completion monitoring/gathering unit 42*c*.

When instructed to activate the DMA transfer unit 43 (to start DMA transfer) by the CPU 2, the activation unit 42*a* instructs the start address/size division unit 42*b* to activate the DMA transfer unit 43.

When receiving the instruction from the activation unit 42*a*, the start address/size division unit 42*b* refers to the setting table 41*a* in the register 41 to acquire the start address and the size of one page of image data of each color of YMCK. Then, the size of one page of image data of each color is divided depending on information on the size of one page of image data to be transferred (data size or resolution) and/or the number of DMA transfer units 43. Herein, the resolution information 41*b* is employed as information corresponding to the size of the image data. The start address/size division unit 42*b* then sets the start address and the size of each item of divided image data of one page of image data of each color in each register 43*r* in each of the DMA transfer units 431 to 434. When the start address/size division unit 42*b* includes the function of the activation unit 42*a*, the activation unit 42*a* can be deleted.

The number of divisions of one page of image data to be transferred may be previously determined depending on the resolution information 41*b*. For example, a division number table indicating a correspondence between resolution and the number of divisions is created and stored in the register 41, and the start address/size division unit 42*b* reads a division number of 4 with reference to the division number table when the resolution of the image data is 1200 dpi.

The start address/size division unit 42*b* may sum up the sizes of the image data of each color of YMCK set in the setting table 41*a* thereby to acquire the size of one page of image data. In this case, the resolution information 41*b* can be deleted from the register 41.

For example, the start address/size division unit 42*b* assumes first to fourth divided image data generated by dividing one page of image data of color Y into four in the case of four colors. The size of one of the first to fourth divided image data is "Y Size/4." Further, the start address/size division unit 42*b* calculates the start addresses corresponding to the first to fourth divided image data. The start address of the first divided image data is the same start address "Y Start" as the non-divided one. Similarly, the start address/size division unit 42*b* calculates a start address and a size of each item of divided image data for three other colors (MCK).

The completion monitoring/gathering unit 42*c* receives the notifications of transfer completion of the divided image data of each color from the DMA transfer units 431 to 434, and gathers the notifications of transfer completion thereby to notify the transfer completion of one page of image data per color to the start address/size division unit 42*b*. The completion monitoring/gathering unit 42*c* notifies transfer completion of one page of image data to the CPU 2 when one page of image data of all the colors is completely transferred.

Operations of Image Processing ASIC According to First Embodiment

Figure 5:
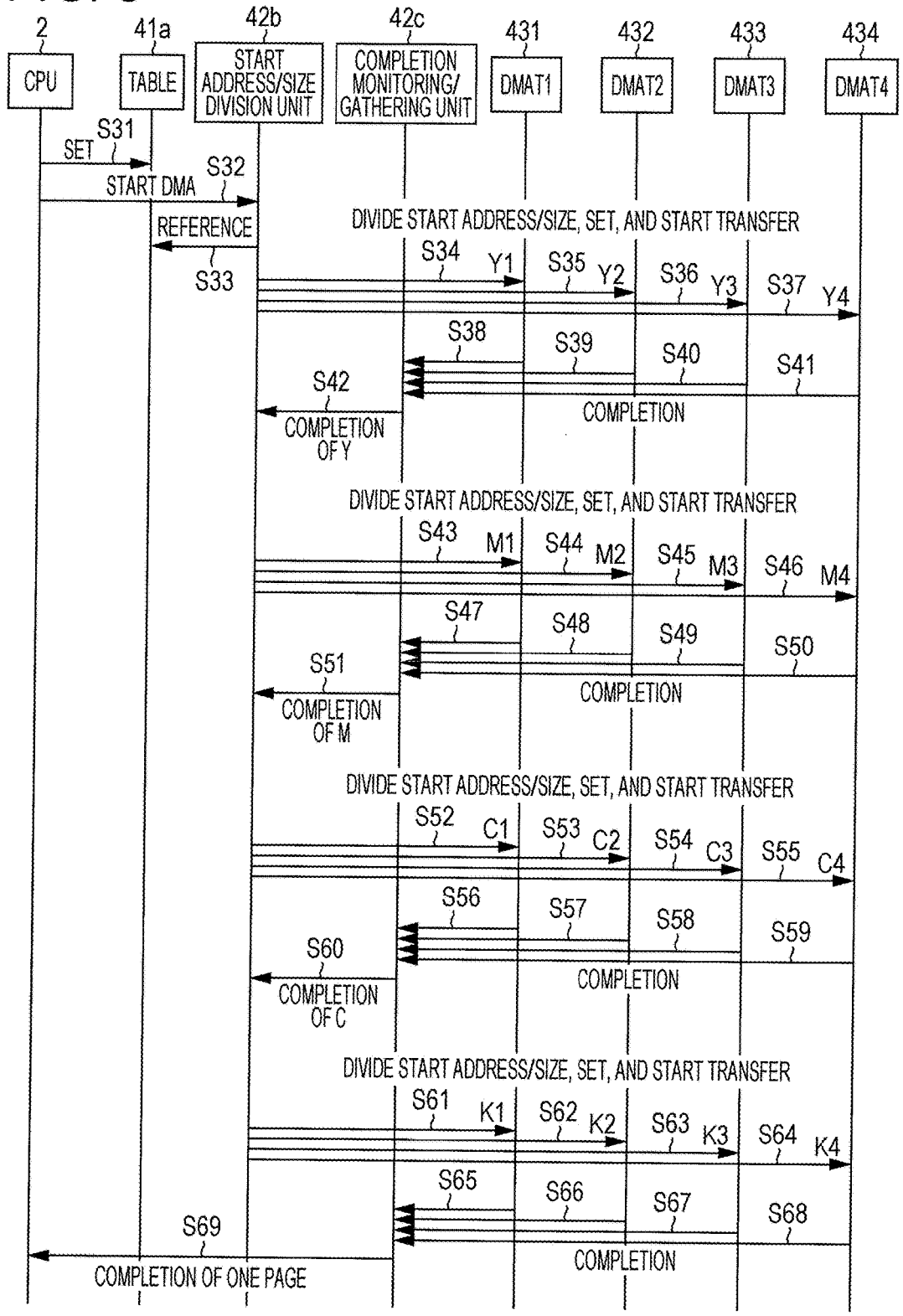
FIG. 5 is a sequence diagram illustrating a DMA transfer processing by the image processing ASIC according to the first embodiment of the present invention.

A flow of DMA transfer by the image processing ASIC 4 in the image forming apparatus 1 will be described below. FIG. 5 is a sequence diagram for explaining DMA transfer by the image processing ASIC 4 in the image forming apparatus 1.

In FIG. 5, at first, when the image data of YMCK stored in the main memory 3 is DMA-transferred, the CPU 2 sets a start address and a size of one page of image data of each color to be transferred in the setting table 41*a* in the register 41 in the transfer unit 4-1 (S31).

The CPU 2 then instructs the activation unit 42*a* in the DMA control unit 42 to activate the DMA transfer unit 43 or to start DMA transfer (S32).

The activation unit 42a then receives the instruction to start DMA transfer from the CPU 2, and refers to the setting table 41a in the register 41 to acquire the start address and the size of one page of image data of each color of YMCK (S33).

The start address/size division unit 42b then divides the size of one page of image data of color Y into four depending on the size of one page of image data to be transferred and the number of DMA transfer units 43. The start address/size division unit 42b then sets the start addresses and the sizes of the divided image data Y1 to Y4 generated by dividing one page of image data of color Y into four in the registers 43r in the four DMA transfer units 431 to 434 corresponding to color Y, and activates the DMA transfer units 431 to 434 to start DMA transfer (S34 to S37). Thereby, the DMA transfer units 431 to 434 read the divided image data Y1 to Y4 configuring one page of image data of color Y from the main memory 3, and output (transfer) it to the buffer memory 44, respectively.

At this time, the buffer memory 44 temporarily stores therein the four items of divided image data Y1 to Y4 (one page of image data of color Y) transferred from the DMA transfer units 431 to 434.

Thereafter, when finishing transferring the corresponding divided image data Y1 to Y4 of color Y, the DMA transfer units 431 to 434 notify the transfer completion to the completion monitoring/gathering unit 42c in the DMA control unit 42 (S38 to S41).

When receiving the notifications of transfer completion from the DMA transfer units 431 to 434, the completion monitoring/gathering unit 42c determines that one page of image data of color Y is completely DMA-transferred. However, the completion monitoring/gathering unit 42c notifies the transfer completion of one page of image data of color Y to the start address/size division unit 42b without notifying the transfer completion of one page of image data of color Y to the CPU 2 (S42).

The start address/size division unit 42b and the DMA transfer units 431 to 434 then divide the size of the image data of color M into four, and perform the DMA transfer processing and make the notification of transfer completion for the divided image data M1 to M4 similarly as for color Y (S43 to S50). The completion monitoring/gathering unit 42c then receives the notifications of transfer completion from the DMA transfer units 431 to 434, and notifies the transfer completion of one page of image data of color M to the start address/size division unit 42b (S51).

The start address/size division unit 42b and the DMA transfer units 431 to 434 then divide the size of the image data of color C into four, and perform the DMA transfer processing and make the notification of transfer completion for the divided image data C1 to C4 similarly as for color Y (S52 to S59). The completion monitoring/gathering unit 42c then receives the notifications of transfer completion from the DMA transfer units 431 to 434, and notifies the transfer completion of one page of image data of color C to the start address/size division unit 42b (S60).

The start address/size division unit 42b and the DMA transfer units 431 to 434 then divide the size of the image data of color K into four, and perform the DMA transfer processing and make the completion notification for the divided image data K1 to K4 similarly as for color Y (S61 to S68).

Herein, when receiving the notifications of transfer completion from the DMA transfer units 431 to 434, the completion monitoring/gathering unit 42c determines that the DMA transfer of one page of image data of color K is completed and the DMA transfer of one page of image data of all the colors is completed. The completion monitoring/gathering unit 42c then notifies the completion of the DMA transfer of one page of image data to the CPU 2 (S69).

According to the first embodiment, the configuration of the register 41 as well as the activation of the DMA transfer unit 43 during DMA transfer and the page-based completion notification to the CPU 2 is not changed, and thus the software and the loads on the CPU 2 are not changed. That is, an existing register (or group of registers) is used thereby to make page-based completion notification when one page of image data is completely transferred. Therefore, a plurality of DMA transfer units 43 distribute and transfer image data, thereby reducing the loads on the CPU while using the existing software. In this way, according to the first embodiment, large-size image data can be distributed and transferred by use of a plurality of DMA transfer units 431 to 434 without changing the software and increasing the loads on the CPU 2. Thus, the image data transfer processing capability (performance) of the image processing ASIC 4 mounted on the image forming apparatus 1 is enhanced.

Further, the DMA control unit 42 in the image processing ASIC 4, or the hardware divides a start address and a size of image data of each color, and thus a delay in time is not caused.

First Variant of First Embodiment

The register indicating the resolution information 41b is added according to the first embodiment, but not the resolution but the buffer size (storage capacity) of the buffer memory 44 arranged behind the DMA transfer unit 43 may be considered. That is, the DMA control unit 42 divides one page of image data of each color, and distributes and transfers the divided image data on the basis of the size of one page of image data of each color set in the setting table 41a and the buffer size of the buffer memory 44. At this time, the DMA control unit 42 determines the number of divisions of one page of image data of each color such that the image data of each color to be transferred does not exceed the buffer size of the buffer memory 44.

With the configuration of the first variant, the image data of each color to be transferred does not exceed the buffer size of the buffer memory 44, and thus DMA transfer can be preferably performed. Further, the number of divisions, or the number of DMA transfer units 43 to be used can be flexibly changed depending on the buffer size of the buffer memory 44.

Second Variant of First Embodiment

When the resolution or size of the image data to be transferred stored in the main memory 3 is as before, the DMA control unit 42 may perform DMA transfer without dividing the image data as before. For example, the DMA control unit 42 determines whether the resolution or size of one page of image data stored in the main memory 3 is lower than a predetermined value (600 dpi or size corresponding to 600 dpi, for example). When the resolution or size of one page of image data to be transferred is lower than the predetermined value, the DMA control unit 42 performs DMA transfer without dividing one page of image data.

With the configuration of the second variant, when the resolution or size of the image data to be transferred stored in the main memory 3 is small, the image data to be transferred is subjected to DMA transfer without being divided, thereby reducing a time for the image data DMA transfer.

One page of image data of each color is divided into four depending on the number of DMA transfer units 43 according to the present embodiment, but it may be divided into two or three.

2. Second Embodiment

A second embodiment is an example in which the image processing ASIC 4 in the image forming apparatus 1 includes eight DMA transfer units.

Figure 6:
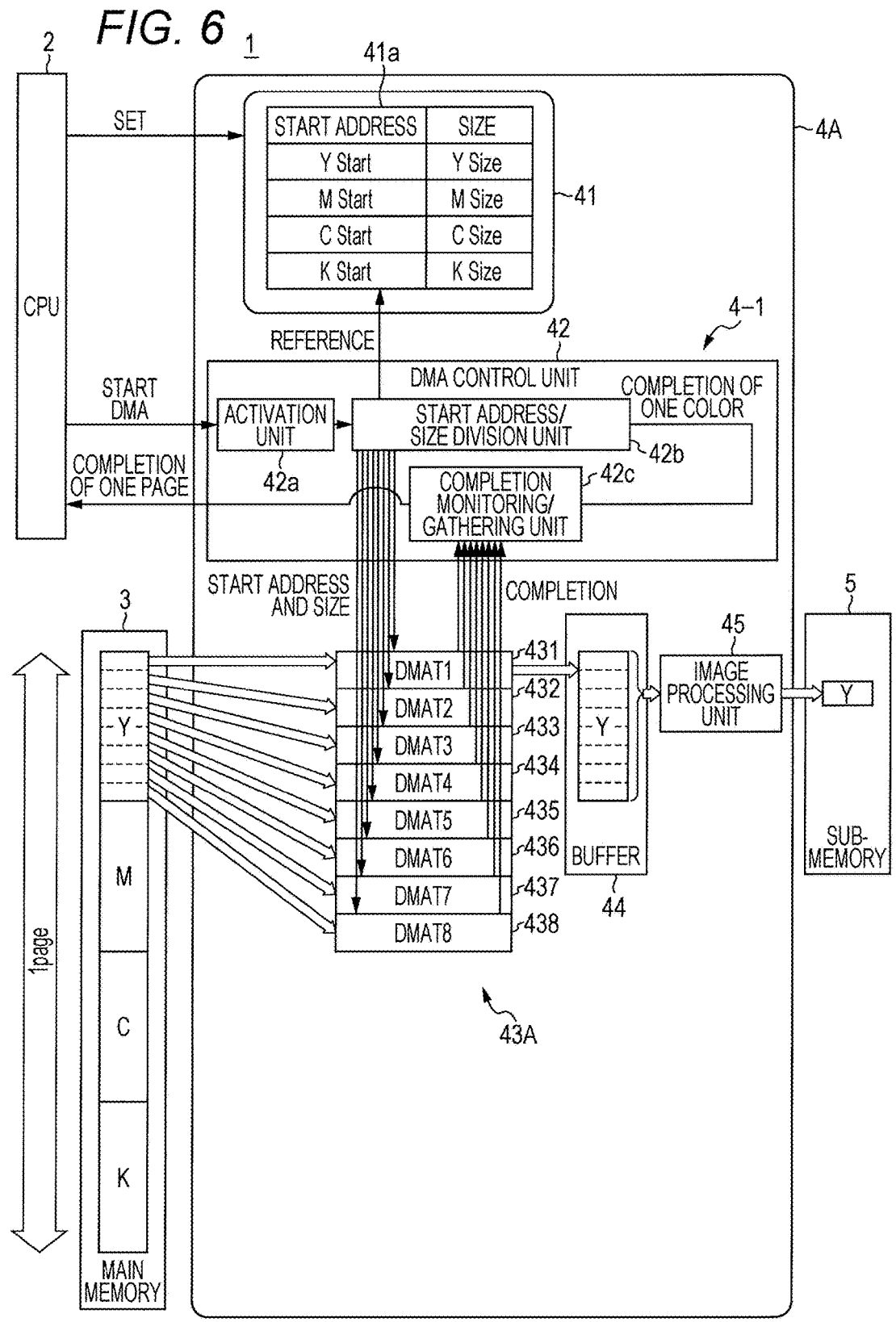
FIG. 6 is a sequence diagram illustrating an exemplary internal configuration of an image processing ASIC in an image forming apparatus according to a second embodiment of the present invention.

FIG. 6 is a block diagram illustrating an exemplary internal configuration of an image processing ASIC according to the second embodiment. A DMA transfer unit 43A in an image processing ASIC 4A includes eight DMA transfer units 431 to 438. The configuration and function of the DMA transfer units 435 to 438 are the same as the DMA transfer units 431 to 434. In FIG. 6, the resolution (data size) of the image data stored in the main memory 3 is assumed to be much larger than 1200 dpi in FIG. 4. The register 41 in FIG. 6 does not hold the resolution information 41b (FIG. 4).

Figure 7:
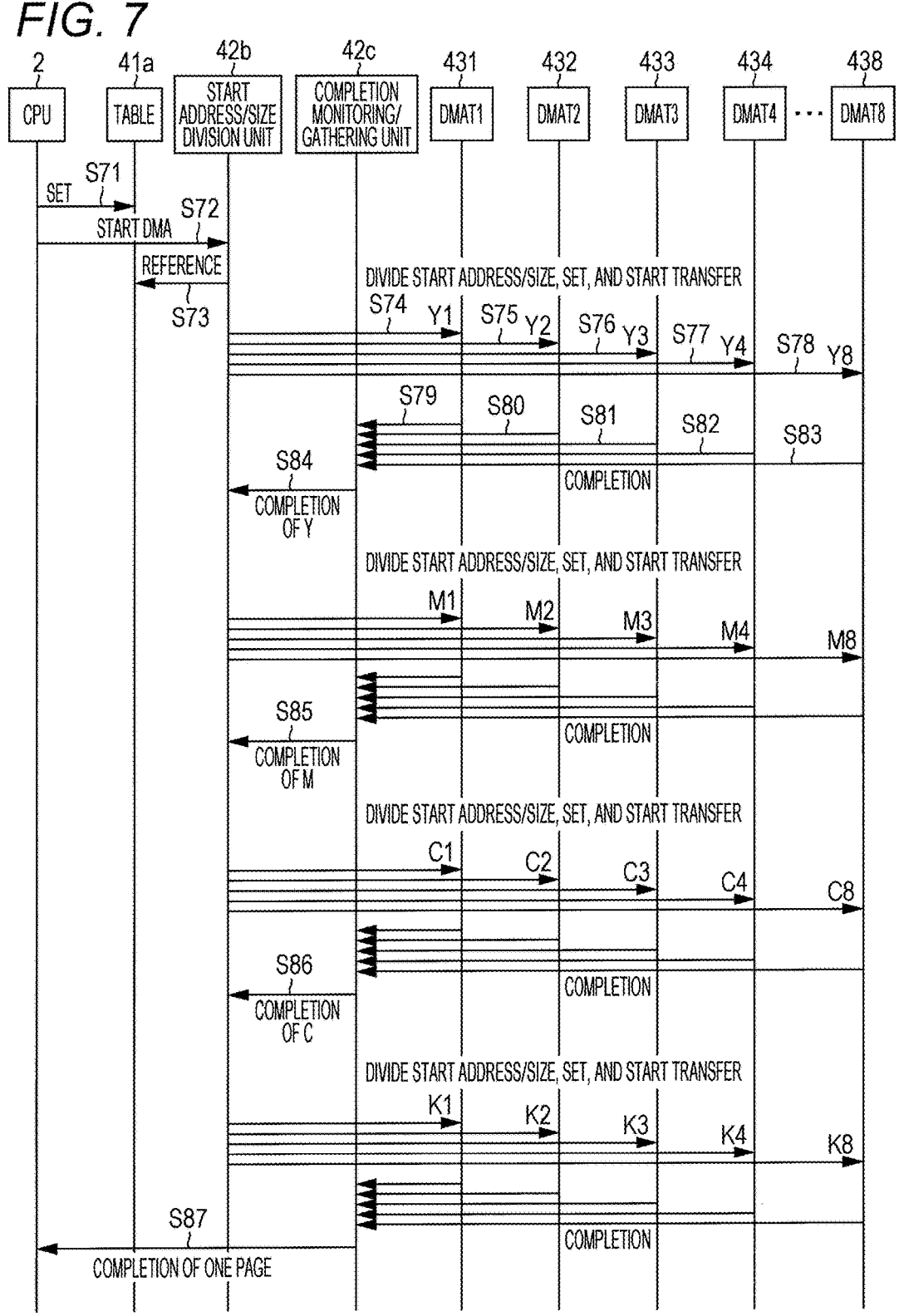
FIG. 7 is a sequence diagram illustrating a DMA transfer processing by the image processing ASIC according to the second embodiment of the present invention.

A flow of DMA transfer by the image processing ASIC 4A in the image forming apparatus 1 according to the second embodiment will be described below. FIG. 7 is a sequence diagram for explaining DMA transfer by the image processing ASIC 4A.

The series of processing in steps S71 to S73 in FIG. 7 is the same as the series of processing in steps S31 to S33 in FIG. 5, and thus the description thereof will be omitted.

After the processing in step S73 ends, the start address/size division unit 42b divides the size of one page of image data of color Y into eight. Herein, one page of image data is assumed to be divided into eight according to the number of DMA transfer units 43 irrespective of the resolution of the image data. The start address/size division unit 42b then sets the start addresses and the sizes of the divided image data Y1 to Y8 generated by dividing one page of image data of color Y into eight in the registers 43r in the eight DMA transfer units 431 to 438 corresponding to color Y, and activates the DMA transfer units 431 to 438 thereby to start DMA transfer (S74 to S78). The series of processing in S74 to S78 is similar to steps S34 to S37 in FIG. 5.

At this time, the buffer memory 44 temporarily stores therein the eight items of divided image data Y1 to Y8 (one page of image data of color Y) transferred from the DMA transfer units 431 to 438.

Thereafter, when finishing transferring the corresponding divided image data Y1 to Y8 of color Y, the DMA transfer units 431 to 438 notify the transfer completion to the completion monitoring/gathering unit 42c in the DMA control unit 42 (S79 to S83). The series of processing in S79 to S83 is similar to steps S38 to S41 in FIG. 5.

The completion monitoring/gathering unit 42c then receives the notifications of transfer completion from the DMA transfer units 431 to 438, and notifies the transfer completion of one page of image data of color Y to the start address/size division unit 42b (S84). The processing in S84 is similar to step S42 in FIG. 5.

The start address/size division unit 42b and the DMA transfer units 431 to 438 then divide the size of the image data of color M into eight, and perform the DMA transfer processing and make the notification of transfer completion for the divided image data M1 to M8 similarly as for color Y. The completion monitoring/gathering unit 42c then receives the notifications of transfer completion from the DMA transfer units 431 to 438, and notifies the transfer completion of one page of image data of color M to the start address/size division unit 42b (S85).

The start address/size division unit 42b and the DMA transfer units 431 to 438 then divide the size of the image data of color C into eight, and similarly perform the DMA transfer processing and make the notification of transfer completion for the divided image data C1 to C8. The completion monitoring/gathering unit 42c then receives the notifications of transfer completion from the DMA transfer units 431 to 438, and notifies the transfer completion of one page of image data of color C to the start address/size division unit 42b (S86).

The start address/size division unit 42b and the DMA transfer units 431 to 438 divide the size of the image data of color K into eight, and similarly perform the DMA transfer processing and make the notification of transfer completion for the divided image data K1 to K8. Herein, the completion monitoring/gathering unit 42c receives the notifications of transfer completion from the DMA transfer units 431 to 438, and determines that the DMA transfer of one page of image data of color K is completed and the DMA transfer of one page of image data of all the colors is completed. The completion monitoring/gathering unit 42c then notifies the completion of the DMA transfer of one page of image data to the CPU 2 (S87).

The second embodiment produces the following operational effects in addition to the operational effects obtained according to the first embodiment. According to the second embodiment, more DMA transfer units 431 to 438 than in the first embodiment are prepared and the number of divisions of image data is changed, thereby performing the DMA transfer processing on image data with a larger data size.

According to the second embodiment, image data of one color is divided and the respective items of divided image data are subjected to DMA transfer by many DMA transfer units 431 to 438 in parallel. Therefore, it is possible to enhance the image data processing speed of the image processing ASIC 4A, or the transfer processing capability.

3. Third Embodiment

A third embodiment is an example in which transfer completion of the DMA transfer units 43 is notified to the start address/size division unit 42b not in units of color but in units of DMA transfer unit.

Figure 8:
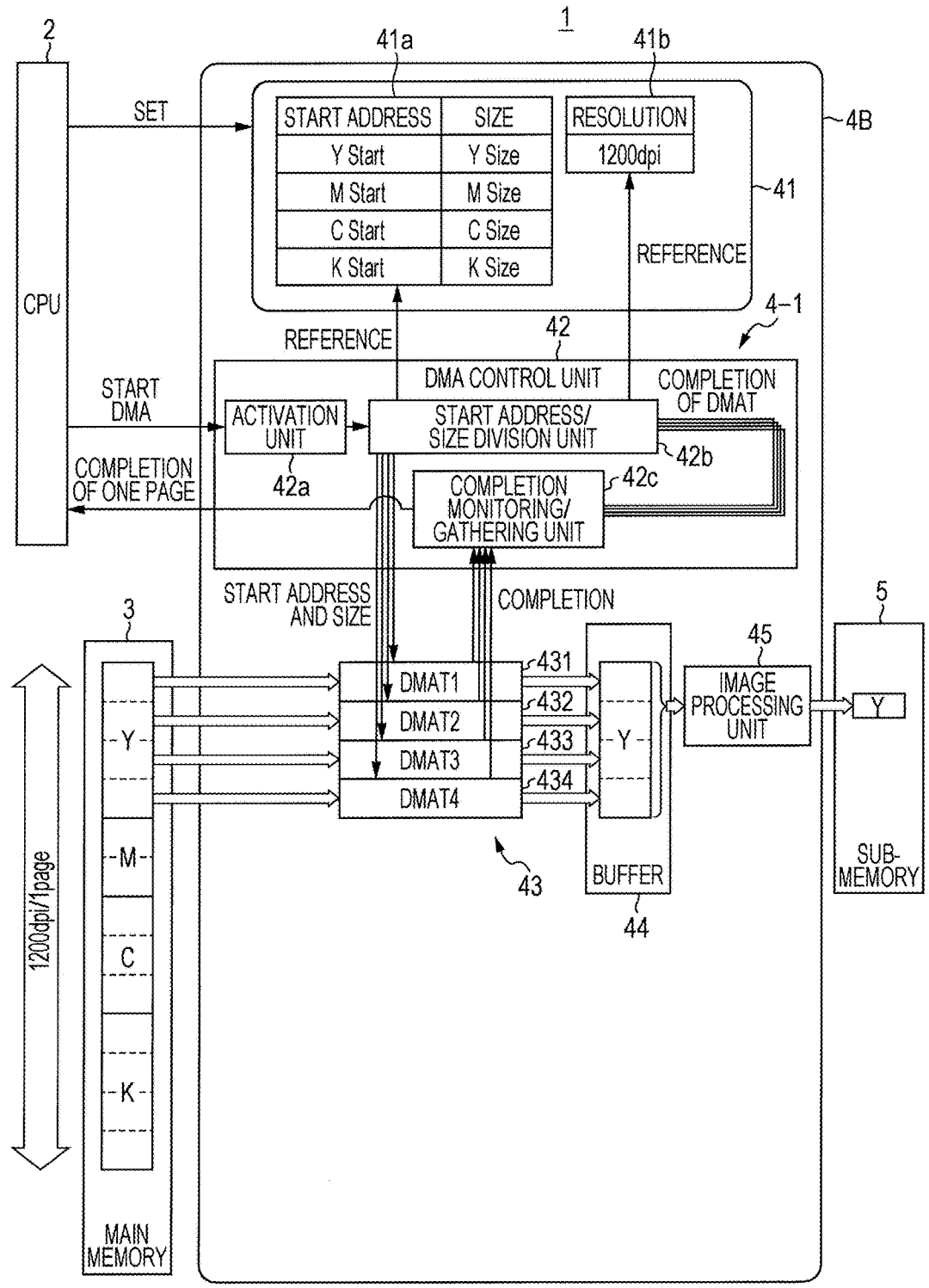
FIG. 8 is a sequence diagram illustrating an exemplary internal configuration of an image processing ASIC in an image forming apparatus according to a third embodiment of the present invention.

FIG. 8 is a block diagram illustrating an exemplary internal configuration of an image processing ASIC according to the third embodiment. The internal configuration of the DMA control unit 42 in an image processing ASIC 4B is the same as the image processing ASIC 4 according to the first embodiment. However, the operations of the completion monitoring/gathering unit 42c and the start address/size division unit 42b in the DMA control unit 42 are different from the first and second embodiments (FIG. 4, FIG. 6). Each time notified of transfer completion from each DMA transfer unit, the completion monitoring/gathering unit 42c notifies the transfer completion (DMAT completion) to the start address/size division unit 42b.

In the example of FIG. 8, the resolution of one page of image data stored in the main memory 3 is 1200 dpi. For the image data of each color configuring the image data, the data size of the image data of color C is smaller than that of the image data of color Y and color K, and the data size of the image data of color M is much smaller.

Figure 9:
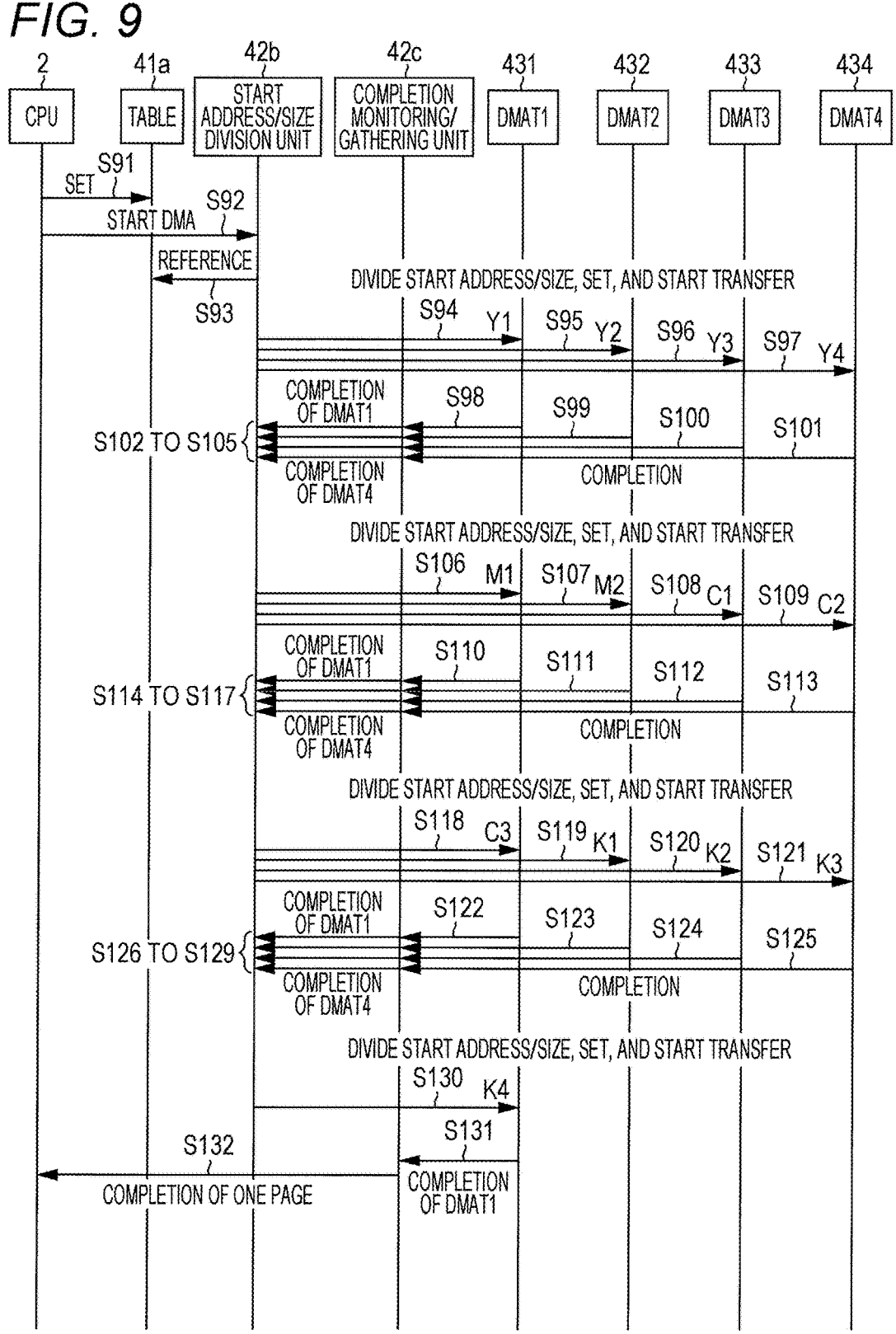
FIG. 9 is a sequence diagram illustrating a DMA transfer processing by the image processing ASIC according to the third embodiment of the present invention.

A flow of DMA transfer by the image processing ASIC 4B in the image forming apparatus 1 according to the third embodiment will be described below. FIG. 9 is a sequence diagram for explaining DMA transfer by the image processing ASIC 4B.

The series of processing in steps S91 to S93 in FIG. 9 is the same as the series of processing in steps S31 to S33 in FIG. 5, and thus the description thereof will be omitted.

The start address/size division unit 42b and the DMA transfer units 431 to 434 then divide the size of the image data of color Y into four, and perform the DMA transfer processing and make the notification of transfer completion for the divided image data Y1 to Y4 (S94 to S101). The series of processing in steps S94 to S101 is the same as the series of processing in steps S34 to S41 in FIG. 5.

When receiving the notifications of transfer completion from the DMA transfer units 431 to 434, the completion monitoring/gathering unit 42c sequentially sends the notifications of transfer completion to the start address/size division unit 42b for each of the DMA transfer units 431 to 434 (S102 to S105).

The start address/size division unit 42b and the DMA transfer units 431 and 432 then divide the size of the image data of color M into two, and perform the DMA transfer processing and make the notification of transfer completion for the divided image data M1 to M2 (S106, S107, S110, S111).

When receiving the notifications of transfer completion from the DMA transfer units 431 to 432, the completion monitoring/gathering unit 42c sequentially sends the notifications of transfer completion to the start address/size division unit 42b for each of the DMA transfer units 431 and 432 (S114, S115).

Herein, the start address/size division unit 42b grasps that the DMA transfer units 433 and 434 are not used during the transfer processing for color M from the division number information held in the register 41 or the start address/size division unit 42b. The start address/size division unit 42b then divides the size of the image data of color C into three, and sets the start addresses and the sizes of the divided image data C1 to C3 in the registers 43r in the three DMA transfer units 433, 434, and 431, respectively. The DMA transfer units 433, 434, and 431 then start the DMA transfer processing for the divided image data C1 to C3 (S108, S109, S118). Thereafter, the DMA transfer units 433, 434, and 431 make a notification of transfer completion (S112, S113, S122). Actually, the DMA transfer unit 431 starts transferring the divided image data C3 of color C after the divided image data M1 of color M is completely transferred.

When receiving the notifications of transfer completion from the DMA transfer units 433, 434 and 431, the completion monitoring/gathering unit 42c sequentially sends the notifications of transfer completion to the start address/size division unit 42b for each of the DMA transfer units 433, 434, and 431 (S116, S117, S126).

Since the DMA transfer units 432 to 434 are not used during the transfer processing for color C, the completion monitoring/gathering unit 42c divides the size of the image data of color K into four, and the DMA transfer units 432 to 434 and 431 start the DMA transfer processing for the divided image data K1 to K4 (S119 to S121, S130). Thereafter, the DMA transfer units 432 to 434 and 431 make a notification of transfer completion (S123 to S125, S131). Actually, the DMA transfer unit 431 starts transferring the divided image data K4 of color K after the divided image data C3 of color C is completely transferred.

When receiving the notifications of transfer completion from the DMA transfer units 432 to 434, the completion monitoring/gathering unit 42c sequentially sends the notifications of transfer completion to the start address/size division unit 42b for each of the DMA transfer units 432 to 434 (S127 to S129). The completion monitoring/gathering unit 42c receives the notification of transfer completion from the DMA transfer unit 431, and determines that the DMA transfer of one page of image data of color K is completed and the DMA transfer of one page of image data of all the colors is completed. The completion monitoring/gathering unit 42c then notifies the completion of the DMA transfer of one page of image data to the CPU 2 (S132).

The third embodiment produces the following operational effects in addition to the operational effects obtained according to the first embodiment. According to the third embodiment, the start address/size division unit 42b determines the presence of a non-working DMA transfer unit, and can start transferring image data of next color before image data of a color is completely transferred if there is a non-working DMA transfer unit.

When a page size of image data is different per color, all the DMA transfer units 43 are used to distribute and transfer image data of a color for the color with a large page size as in the first embodiment. However, when the buffer size of the buffer memory 44 is enough or a buffer memory for two or more colors is prepared, the transfer efficiency may be better when image data of next color starts being transferring as in the present embodiment. At this time, a completion notification of each DMA transfer unit is made from the completion monitoring/gathering unit 42c to the start address/size division unit 42b so that the better transfer efficiency can be realized.

For example, there may be employed a dual inline memory module (DIMM) in which a plurality of dynamic RAM (DRAM) chips are mounted on either or both sides of a plastic substrate as a memory capable of preparing a buffer memory for two or more colors.

4. Others

According to the first to third embodiments, when the print engine 6 includes a function of forming an image of a fifth color other than the colors YMCK, the image data of the fifth color is included in one page of image data stored in the main memory 3. When the image data of the fifth color is transferred, the CPU 2 sets a start address and a size of the image data of the fifth color in the setting table 41a in the register 41 similarly as in the first to third embodiments, thereby realizing the DMA transfer with reference to the setting table 41a.

Thereby, when the image data of the fifth color is transferred, the DMA transfer can be realized by use of a plurality of DMA transfer units by a minimum modification of setting a start address and a size of the image data of the fifth color in the setting table 41a.

Further, embodiments of the present invention are not limited to the above-described ones, and various applications and variants may be employed without departing from the spirit of the embodiments of the present invention described in What is claimed is.

For example, the configurations of the apparatus and the system have been specifically described in detail in order to easily explain the embodiments of the present invention, and embodiments are not necessarily limited to those including all the described configurations. Further, part of the configuration of an embodiment may be replaced with the configuration of other embodiment. The configuration of an embodiment may be added with the configuration of other embodiment. Part of the configuration of each embodiment may be added, deleted or replaced with other configuration.

Some or all of the configurations, functions, processing units, and processing sections may be designed in an integrated circuit, for example, thereby to be realized in hardware. Further, the processor interprets and executes the programs for realizing the respective functions thereby to realize the configurations and functions described above in software. The information such as programs, tables, and files for realizing each function may be stored in a recording device such as memory, hard disc, or solid state drive (SSD) or a recording medium such as IC card, SD card or DVD.

The control lines or information lines, which are considered as needed for the description, are illustrated, but all the control lines or information lines required for the products are not necessarily illustrated. Almost all the configurations may be actually considered as mutually connected.

In the specification, the processing steps describing the time-series processing include the series of processing performed in time series in the described order, and the series of processing (such as parallel processing or object-based processing) performed in parallel or individually, which are not necessarily performed in time series.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus comprising:
a first memory for temporarily storing therein image data of a predetermined number of colors output to an image forming unit for forming an image per predetermined color;
a data processing processor for reading the image data of each color from the first memory;
a second memory for temporarily storing therein the image data of each color read from the first memory; and
a main processor for causing the data processing processor to sequentially read the image data of each color from the first memory and output it to the second memory, wherein the data processing processor comprises:
a plurality of data transfer units provided corresponding to each color for reading the image data from the first memory and transferring it to the second memory;
a transfer control unit for controlling and monitoring a processing of transferring the image data by the data transfer units; and
a table, which is referred to when the data transfer units transfer one page of image data, for setting therein a start address and a size of one page of image data of each color in the first memory,
the main processor sets a start address and a size of one page of the image data of each color in the first memory in the table in the data processing processor, and then instructs the transfer control unit in the data processing processor to activate the data transfer units,
when receiving the instruction to activate the data transfer units from the main processor, the transfer control unit divides a size of one page of image data of one color of the predetermined number of colors depending on information on a size of the one page of image data to be transferred and/or the number of data transfer units with reference to the table, and sets a start address and a size of each item of divided image data of the one page of image data of one color of the predetermined number of colors in each of the data transfer units,
each of the data transfer units reads corresponding image data from the image data of one color of the predetermined number of colors in the first memory and outputs it to the second memory on the basis of the start address and the size of each item of divided image data of the one page of image data of one color, and
after the data transfer units finish transferring the one page of image data of one color of the predetermined number of colors, the transfer control unit subsequently controls the data transfer units for dividing a start address and a size of one page of image data of a next color of the predetermined number of colors and transferring the image data, and when one page of image data of all of the predetermined number of colors is completely transferred, notifies the transfer completion of one page of image data of all the colors to the main processor.

2. The image forming apparatus according to claim 1, wherein the transfer control unit comprises:
a start address/size division unit for, when instructed to activate the data transfer units from the main processor, dividing a size of image data of one color among the predetermined number of colors depending on information on a size of the one page of image data to be transferred and/or the number of data transfer units with reference to the table, and setting a start address and a size of each item of divided image data of the image data of one color of the predetermined number of colors in each of the data transfer units; and
a completion monitoring/gathering unit for receiving the notifications of transfer completion of the divided image data of each color of the predetermined number of colors from the data transfer units, gathering the notifications of transfer completion per color and notifying the transfer completion per color to the start address/size division unit, or notifying the transfer completion of one page of image data to the main processor when the one page of image data of all the colors is completely transferred.

3. The image forming apparatus according to claim 1, wherein the transfer control unit controls the one page of image data to be transferred without being divided when a resolution or size of the one page of image data stored in the first memory is smaller than a predetermined value.

4. The image forming apparatus according to claim 1, wherein the transfer control unit determines the number of divisions of one page of image data of each color of the predetermined number of colors depending on the number of the data transfer units.

5. The image forming apparatus according to claim 1, wherein the transfer control unit determines the number of divisions of one page of image data of each color of the predetermined number of colors on the basis of a size of one page of image data of each color set in the table and a storage capacity of the second memory such that image data of each color of the predetermined number of colors to be transferred does not exceed the storage capacity of the second memory.

6. The image forming apparatus according to claim 1, wherein the transfer control unit determines the number of divisions of one page of image data of each color of the predetermined number of colors on the basis of a size of one page of image data of each color.

7. The image forming apparatus according to claim 6, wherein the transfer control unit receives the notifications of transfer completion of the divided image data from the data transfer units, and when a data transfer unit not performing the transfer processing is present, starts transferring image data of a next color of the predetermined number of colors by use of the data transfer unit not performing the transfer processing before the data transfer units finish transferring one page of image data of any color of the predetermined number of colors.

8. The image forming apparatus according to claim 1, wherein when image data of a different color from predetermined colors is stored in the first memory in addition to image data of the predetermined colors, the main processor sets the start addresses and the sizes of one page of image data of the predetermined colors and one page of image data of a different color from the predetermined colors in the table.

9. The image forming apparatus according to claim 1, wherein information on a size of the image data is a size or resolution of the image data.

10. The image forming apparatus according to claim 1, further comprising:
the image forming unit for each color for forming images of colors on a recording medium in a predetermined order of colors on the basis of image data of each color temporarily stored in the second memory.

11. A non-transitory recording medium storing a computer readable program used in a computer provided in an image forming apparatus comprising: a first memory for temporarily storing therein image data of a predetermined number of colors output to an image forming unit for forming an image per predetermined color; a data processing processor for reading the image data of each color from the first memory; a second memory for temporarily storing therein the image data of each color read from the first memory; and a main processor for causing the data processing processor to sequentially read the image data of each color from the first memory and output it to the second memory,
wherein the data processing processor comprises a plurality of data transfer units provided corresponding to each color for reading the image data from the first memory and transferring it to the second memory, a transfer control unit for controlling and monitoring a processing of transferring the image data by the data transfer units, and a table, which is referred to when the data transfer units transfer one page of image data, for setting therein a start address and a size of one page of image data of each color in the first memory, the program for causing the computer to perform the procedures of:

setting a start address and a size of one page of the image data of each color in the first memory in the table in the data processing processor, and then instructing the transfer control unit in the data processing processor to activate the data transfer units;

when receiving the instruction to activate the data transfer units from the main processor, dividing a size of one page of image data of one color of the predetermined number of colors depending on information on a size of the one page of image data to be transferred and/or the number of the data transfer units with reference to the table, and setting a start address and a size of each item of divided image data of the one page of image data of one color of the predetermined number of colors in each of the data transfer units;

reading corresponding image data from the image data of one color of the predetermined number of colors in the first memory and outputting it to the second memory on the basis of the start address and the size of each item of divided image data of the one page of image data of one color of the predetermined number of colors; and after the data transfer units finish transferring the one page of image data of one color, subsequently controlling the data transfer units for dividing a start address and a size of one page of image data of a next color of the predetermined number of colors and transferring the image data, and when one page of image data of all of the predetermined number of colors is completely transferred, notifying the transfer completion of the one page of image data of all the colors to the main processor.

* * * * *